United States Patent
Hsu et al.

(10) Patent No.: US 7,149,041 B2
(45) Date of Patent: Dec. 12, 2006

(54) HEAT DISSIPATION STRUCTURE FOR OPTICAL ENGINE

(75) Inventors: Nien-Hui Hsu, Miao-Li County (TW); Yu-Min Kuo, Miao-Li County (TW); Wen-Hsien Su, Miao-Li County (TW); Shang-Hsuang Wu, Miao-Li County (TW)

(73) Assignee: Coretronic Corporation, Hsinchu (TW)

( * ) Notice: Subject to any disclaimer, the term of this patent is extended or adjusted under 35 U.S.C. 154(b) by 105 days.

(21) Appl. No.: 10/907,864

(22) Filed: Apr. 19, 2005

(65) Prior Publication Data

US 2005/0237620 A1    Oct. 27, 2005

(30) Foreign Application Priority Data

Apr. 23, 2004 (TW) ............................... 93111544 A
Oct. 4, 2004 (TW) ............................... 93130050 A

(51) Int. Cl.
 *G02B 7/02* (2006.01)
 *G03B 21/16* (2006.01)
(52) U.S. Cl. .......................... 359/820; 353/52; 353/60
(58) Field of Classification Search .................. 353/52, 353/55, 56, 60; 359/820
 See application file for complete search history.

(56) References Cited

U.S. PATENT DOCUMENTS 6,671,792 B1 * 12/2003 McAllister .................. 711/220
6,814,445 B1 * 11/2004 Kalyandurg et al. .......... 353/52
6,908,197 B1 * 6/2005 Penn ........................... 353/34
7,077,526 B1 * 7/2006 Overmann et al. ........... 353/52

FOREIGN PATENT DOCUMENTS

JP    2003057755 A  *  2/2003

* cited by examiner

Primary Examiner—David N. Spector
(74) Attorney, Agent, or Firm—Winston Hsu

(57) ABSTRACT

An optical engine includes a light source, an optical main body and a projection lens. The optical main body includes a reflective light valve, a case, a first heat-dissipating device and a heat-insulating device. The reflective light valve reflects the incident light beam to form an image light beam or a dumped light beam that is not projected into the projection lens. The case encloses the light paths of the incident light beam, the image light beam and the dumped light beam. An opening is on the case for the dumped light beam to be projected into. A first heat-dissipating device is fixed on the case and covers the opening for removing the heat generated by the dumped light beam. A heat-insulating device is disposed between the first heat-dissipating device and the case for preventing the heat conduction between the first heat-dissipating device and the case.

20 Claims, 6 Drawing Sheets

HEAT DISSIPATION STRUCTURE FOR OPTICAL ENGINE

BACKGROUND OF INVENTION

1. Field of the Invention

The present invention relates to a heat dissipation structure for an optical engine, and more particularly, to a heat dissipation structure for an optical engine with a reflective light valve.

2. Description of the Prior Art

Please refer to FIG. 1, which shows a conventional optical engine 10. Generally, a projection device with digital light processing (DLP) technology has an optical engine 10. The optical engine 10 includes a light source 12, an optical main body 14 and a projection lens 16. The light source 12 generates an incident light beam 17, and the optical main body 14 processes the incident light beam 17 to become an image light beam 18, and then the image light beam 18 is projected through the projection lens 16 for forming an image.

The optical main body 14 includes a light-filtering module 20, a digital micro-mirror device (DMD) 22 and a case 24. The light-filtering module 20 filters the incident light beam 17 to have a specific color and be projected on the DMD 22. The DMD 22 is an important device with a great number of rotatable micro-mirrors and receives data represented by electronic signals. The angle of each micro-mirror is controlled by current for reflecting an incident light beam 17 to become an image light beam 18 or a dumped light beam 26. The dumped light beam 17 is projected on the case 24 but not into the projection lens 16.

Heat comes from at least three aspects to the DMD 22: the radiation heat from the incident light beam 17, the heat generated by DMD 22 itself while in operation, and the parasitic heat conducted from the optical engine 10 or other components in the projection device. The main source of the parasitic heat is the radiation heat from the incident light beam 17 that is absorbed by the case 24. The cooling of the DMD 22 is good or not directly affects the durability and lifetime of the DMD 22. Thus, conventionally a heat sink 28 is attached on the rear surface of the DMD 22 for cooling in order to lower the temperature of the DMD 22.

While the demand for higher brightness of the projection device increases, the light source 12 must have a high lumen in brightness. However, more heat is generated and the DMD 22 with the conventional cooling method cannot withstand such heat. Therefore, the cooling of the DMD 22 must be improved.

SUMMARY OF INVENTION

The object of the present invention is to provide a heat-dissipation structure for an optical engine for removing the effect of the dumped light to the optical engine in order to solve the problems in the prior art.

In one embodiment of the invention, there is an opening on the case and the location of the opening is on the light path of a dumped light beam for the dumped light beam to be projected into the opening, and further be projected on a first heat-dissipating device covering the opening. The heat of the dumped light beam is dissipated from the first heat-dissipating device. There is a heat-insulating device between the first heat-dissipating device and the case for preventing the heat conduction between the first heat-dissipating device and the case. According to the present invention, the heat produced by the dumped light beam is removed completely for removing a heat source to the reflective light valve. Besides, it is easy to practice the present invention while the cost is low and the effect on lowing the temperature of the reflective light valve is good.

The present embodiment is an optical main body of an optical engine. The optical engine includes a light source, the optical main body and a projection lens. The light source generates an incident light beam, and the optical main body processes the incident light beam to form an image light beam. The image light beam is projected through the projection lens for forming an image. The optical main body includes the reflective light valve, the case, the first heat-dissipating device and the heat-insulating device. The reflective light valve reflects the incident light beam to form the image light beam or the dumped light beam. The dumped light beam is not projected into the projection lens. The case encloses the light paths of the incident light beam, the image light beam and the dumped light beam. There is an opening on the case for the dumped light beam to be projected into the opening. The first heat-dissipating device is fixed on the case and covers the opening for removing the heat generated by the dumped light beam. The heat-insulating device is disposed between the first heat-dissipating device and the case for preventing the heat conduction between the first heat-dissipating device and the case.

In the other embodiment of the invention, there is an opening on the case and the location of the opening is on the light path of a dumped light beam for the dumped light beam to be projected into the opening, and further be projected on a transparent plate covering the opening. The dumped light beam passes through the transparent plate and is projected on a light-blocking device. Thereafter, the heat generated by the dumped light beam on the light-blocking device is dissipated by a cooling airflow. According to the present invention, the heat generated by the dumped light beam is removed completely for removing a heat source to the reflective light valve. Besides, it is easy to practice the present invention while the cost is low and the effect on lowing the temperature of the reflective light valve is good.

The present embodiment is an optical main body of an optical engine. The optical engine includes a light source, the optical main body and a projection lens. The light source generates an incident light beam, and the optical main body processes the incident light beam to form an image light beam. The image light beam is projected through the projection lens for forming an image. The optical main body includes the reflective light valve, the case and the transparent plate. The reflective light valve reflects the incident light beam to form the image light beam or the dumped light beam. The dumped light beam is not projected into the projection lens. The case encloses the light paths of the incident light beam, the image light beam and the dumped light beam. There is an opening on the case for the dumped light beam to be projected into the opening. The transparent plate is fixed on the case and covers the opening for the dumped light beam to pass through.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
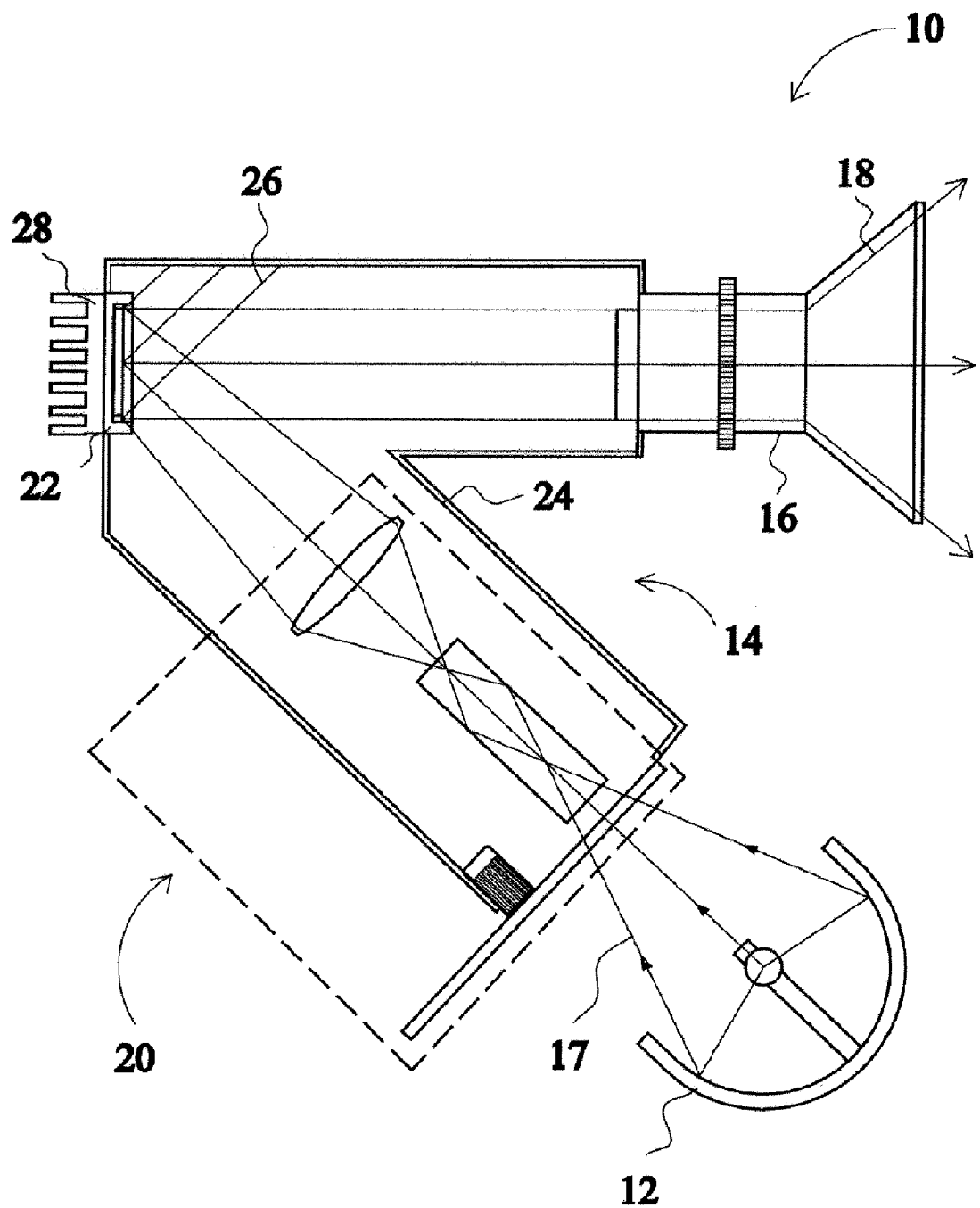
FIG. 1 is a schematic view showing a conventional optical engine.
Figure 2:
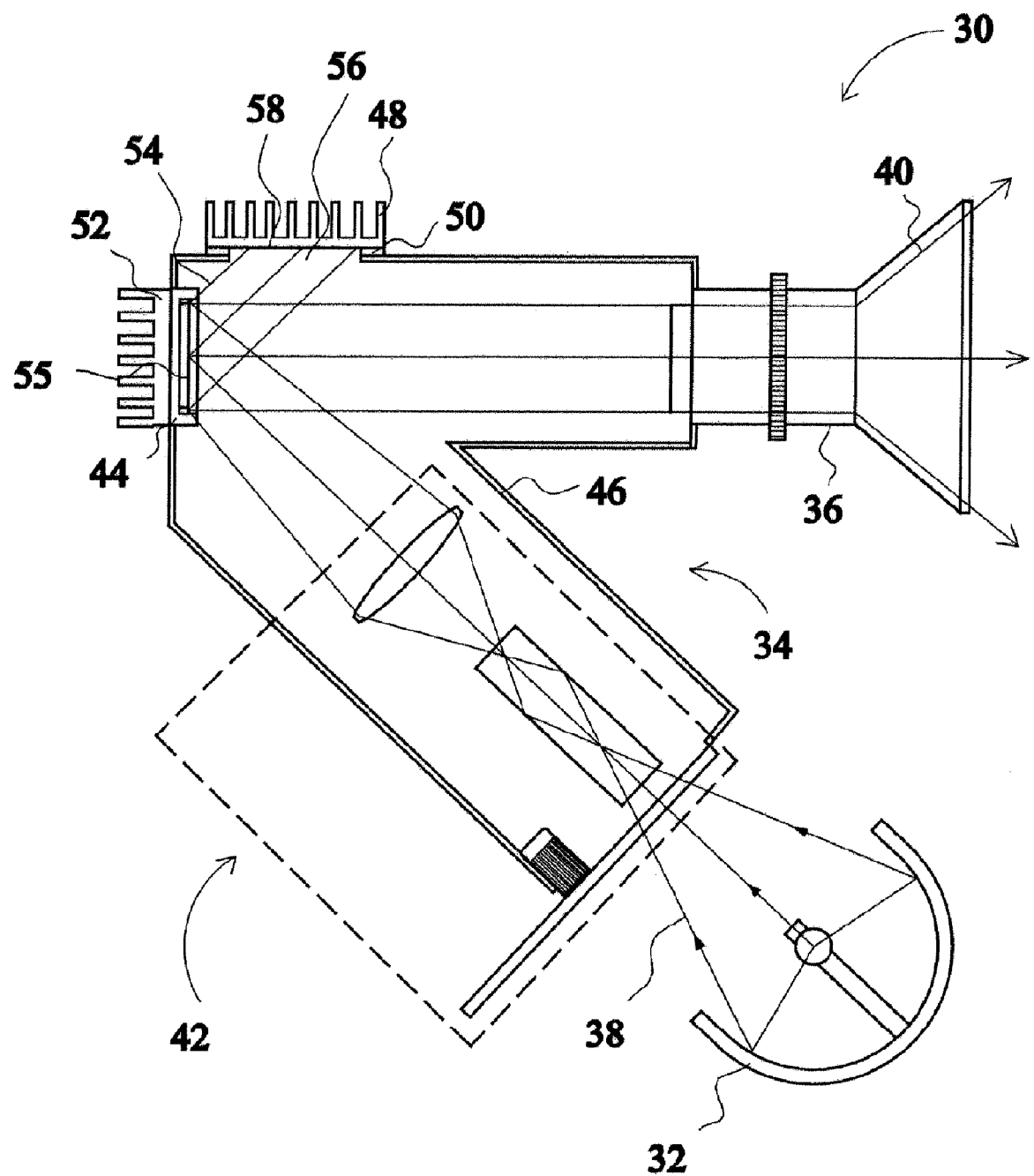
FIG. 2 is a schematic view showing the optical engine of the first preferred embodiment.

In the first preferred embodiment, the optical engine 30 as shown in FIG. 2 includes a light source 32, an optical main body 34 and a projection lens 36. The light source 32 generates an incident light beam 38, and the optical main body 34 processes the incident light beam 38 to form an image light beam 40. The image light beam 40 is projected through the projection lens 36 for forming an image.

The optical main body 34 includes a light-filtering module 42, a reflective light valve 44, a case 46, a first heat-dissipating device 48, a heat-insulating device 50 and a second heat-dissipating device 52. The light-filtering module 42 filters the incident light beam 38 to have a specific color, uniforms the incident light beam 38 and adjusts the light path of the incident light beam 38. Thereafter, the incident light beam 38 is projected on a reflective surface 55 of the reflective light valve 44. According to the images that the optical engine 30 is about to project, the reflective light valve 44 reflects the incident light beam 38 to become an image light beam 40 or a dumped light beam 54 that is not projected into the projection lens 36. In the first preferred embodiment, the reflective light valve 44 is a DMD 44. In other embodiments, the reflective light valve 44 can be a liquid crystal on silicon (LCOS).

The case 46 for blocking ambient light wraps the light-filtering module 42 and the DMD 44 and is connected to the projection lens 36. The case 44 encloses the light paths of the incident light beam 38, the image light beam 40 and the dumped light beam 54. There is an opening 56 on the case 46. The first heat-dissipating device 48 is fixed on the case 46 and covers the opening 56. The first heat-insulating device 50 is disposed between the first heat-dissipating device 48 and the case 46 for preventing the heat conduction between the first heat-dissipating device 48 and the case 46.

The reflective surface 55 of the DMD 44 is composed of a great number of rotatable micro-mirrors (not shown in the figure), and the angle of each micro-mirror is controlled by the DMD 44 for reflecting the incident light beam 38 to become an image light beam 40 or a dumped light beam 54; therefore, the light path of the dumped light beam 54 is predictable. The opening 56 is disposed on the light path of the dumped light beam 54 and the size thereof must allow the dumped light beam 54 to completely pass through and then be projected on the first heat-dissipating device 48. A light-absorbing layer 58 is applied on one lateral side of the first heat-dissipating device 48 facing the opening 56 for absorbing the dumped light beam 54 and dissipating the heat generated from the dumped light beam 54 through the heat-dissipating device 48.

A second heat-dissipating device 52 is disposed on the rear surface of the DMD 44 reverse to the reflective surface 55. The second heat-dissipating device 52 is for removing the heat on the DMD 44, and can be a heat sink.

Figure 3:
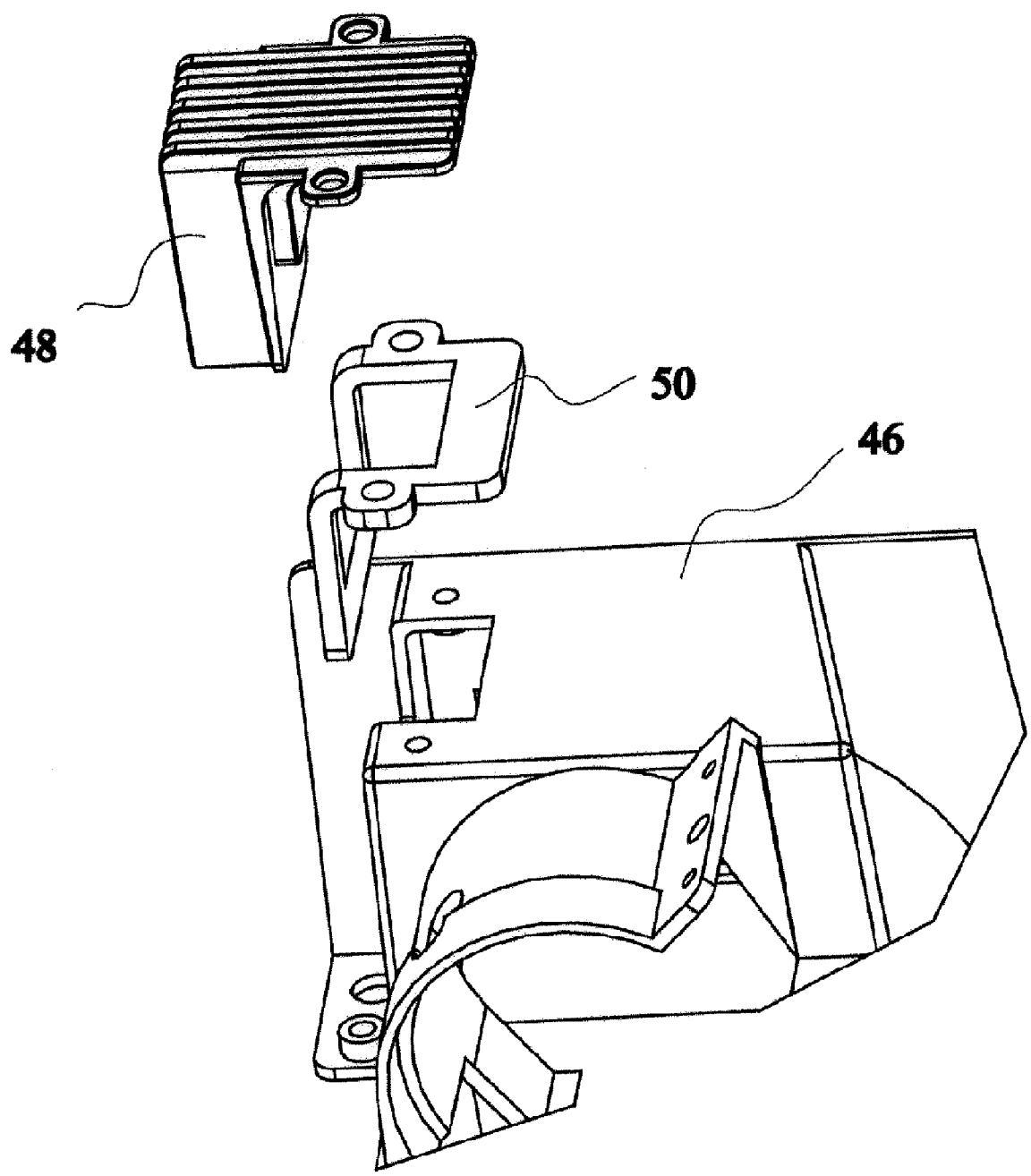
FIG. 3 is an exploded view showing the first heat-dissipating device and the case in the first preferred embodiment.
Figure 4:
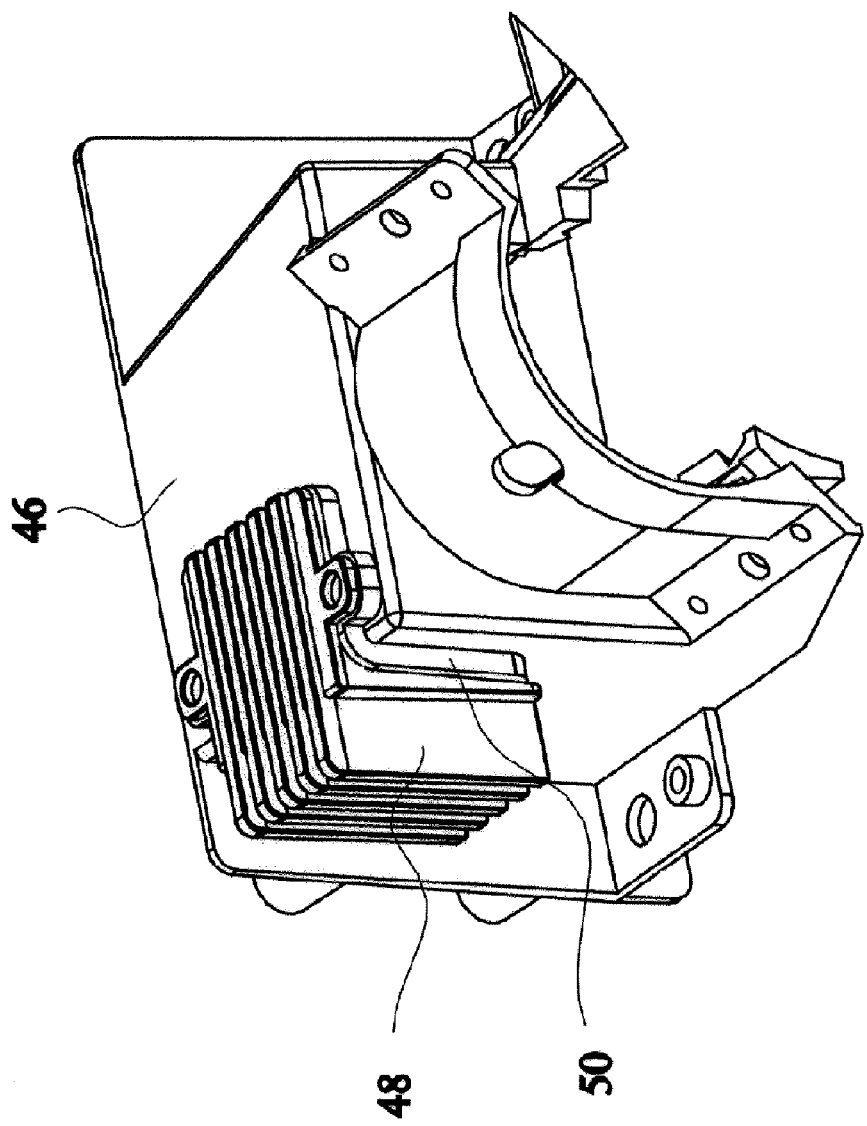
FIG. 4 is a combination view showing the first heat-dissipating device and the case in the first preferred embodiment.

Please refer to both FIG. 3 and FIG. 4. In the first preferred embodiment, the first heat-dissipating device 48 is a heat sink 48, while the heat-insulating device 50 is a cushion 50 made of a heat-insulating material such as rubber. The heat sink 48 dissipates the heat generated from the dumped light beam 54; and besides, the heat on the heat sink 48 is not conducted to the case 46 because the cushion 50 separates the heat sink 48 and the case 46.

In the second preferred embodiment, the heat-insulating device 50 is heat-insulating glue (not shown in the figure). The first heat-dissipating device 48 is pasted on the case 46 by using the heat-insulating glue, and thereby the heat conduction between the first heat-dissipating device 48 and case 46 is insulated, thus the heat-insulating glue substitutes the cushion 50 in the first preferred embodiment. The other parts in the second preferred embodiment are the same as those in the first preferred embodiment, and thus are not given unnecessary details.

In the first and the second preferred embodiments, there is an opening 56 on the case 46. The opening 56 is disposed on the light path of the dumped light beam 54 and the size thereof must allow the dumped light beam 54 to completely pass through and then be projected on the first heat-dissipating device 48. A light-absorbing layer 58 is applied on one side of the heat-dissipating device 48 facing the opening 56 for absorbing the dumped light beam 54 and dissipating the heat generated from the dumped light beam 54 through the first heat-dissipating device 48. In addition, the heat-insulating device 50 is disposed between the first heat-dissipating device 48 and the case 46 for insulating the heat conduction between the first heat-dissipating device 48 and the case 46. According to the present invention, the heat produced by the dumped light beam 54 is removed completely for removing a heat source to the reflective light valve 44. Besides, it is easy to practice the present invention while the cost is low and the effect on lowing the temperature of the reflective light valve 44 is good.

Figure 5:
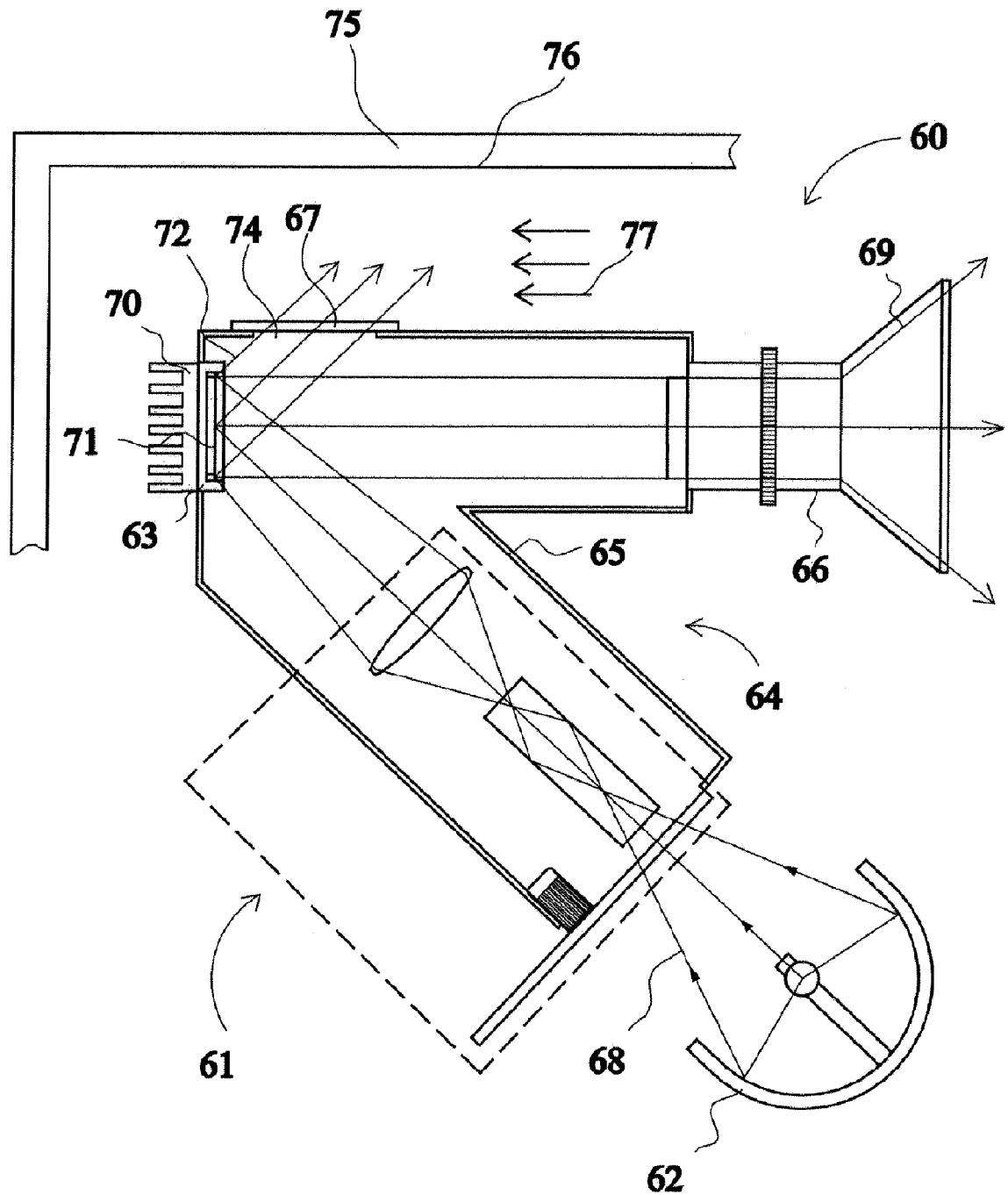
FIG. 5 is a schematic view showing the optical engine of the fourth preferred embodiment.

In the third preferred embodiment, the optical engine 60 as shown in FIG. 5 includes a light source 62, an optical main body 64 and a projection lens 66. The light source 62 generates an incident light beam 68, and the optical main body 64 processes the incident light beam 68 to form an image light beam 69. The image light beam 69 is projected through the projection lens 66 for forming an image.

The optical main body 64 includes a light-filtering module 61, a reflective light valve 63, a case 65, a transparent plate 67 and a light-blocking device. The light-filtering module 61 filters the incident light beam 68 to have a specific color, uniforms the incident light beam 68 and adjusts the light path of the incident light beam 68. Thereafter, the incident light beam 68 is projected on a reflective surface 71 of the reflective light valve 63. According to the images that the optical engine 60 is about to project, the reflective light valve 63 reflects the incident light beam 68 to become an image light beam 69 or a dumped light beam 72 that is not projected into the projection lens 66. In the third preferred embodiment, the transparent plate 67 is transparent glass while the reflective light valve 63 is a DMD 63. In other embodiments, the reflective light valve 63 can be a liquid crystal on silicon (LCOS).

The case 65 for blocking ambient light wraps the light-filtering module 61 and the DMD 63 and is connected to the projection lens 66. The case 65 encloses the light paths of the incident light beam 68, the image light beam 69 and the dumped light beam 72. There is an opening 74 on the case 65. The transparent plate 67 is fixed on the case 65 and covers the opening 74.

The reflective surface 71 of the DMD 63 is composed of a great number of rotatable micro-mirrors (not shown in the figure), and the angle of each micro-mirror is controlled by the DMD 63 for reflecting the incident light beam 68 to become an image light beam 69 or a dumped light beam 72; therefore, the light path of the dumped light beam 72 is predictable. The opening 74 is disposed on the light path of the dumped light beam 72 and the size thereof must allow the dumped light beam 72 to completely pass through and then be projected on the transparent plate 67. Afterward, the dumped light beam 72 passes through the transparent plate 67 and is projected on the light-blocking device. In this embodiment, the optical engine 60 is disposed in a projection device (not shown in the figure) while wrapped by a housing 75 of the projection device, and the light-blocking device is the housing 75. A light-absorbing layer 76 is applied on the inside of the housing 75 opposite to the dumped light beam 72 for absorbing the dumped light beam 72. A cooling airflow 77 between the optical engine 60 and the projection device dissipates the heat generated by the dumped light beam 72.

A second heat-dissipating device 70 is disposed on the rear surface of the DMD 63 reverse to the reflective surface 71. The second heat-dissipating device 70 is for removing the heat on the DMD 63, and can be a heat sink.

Figure 6:
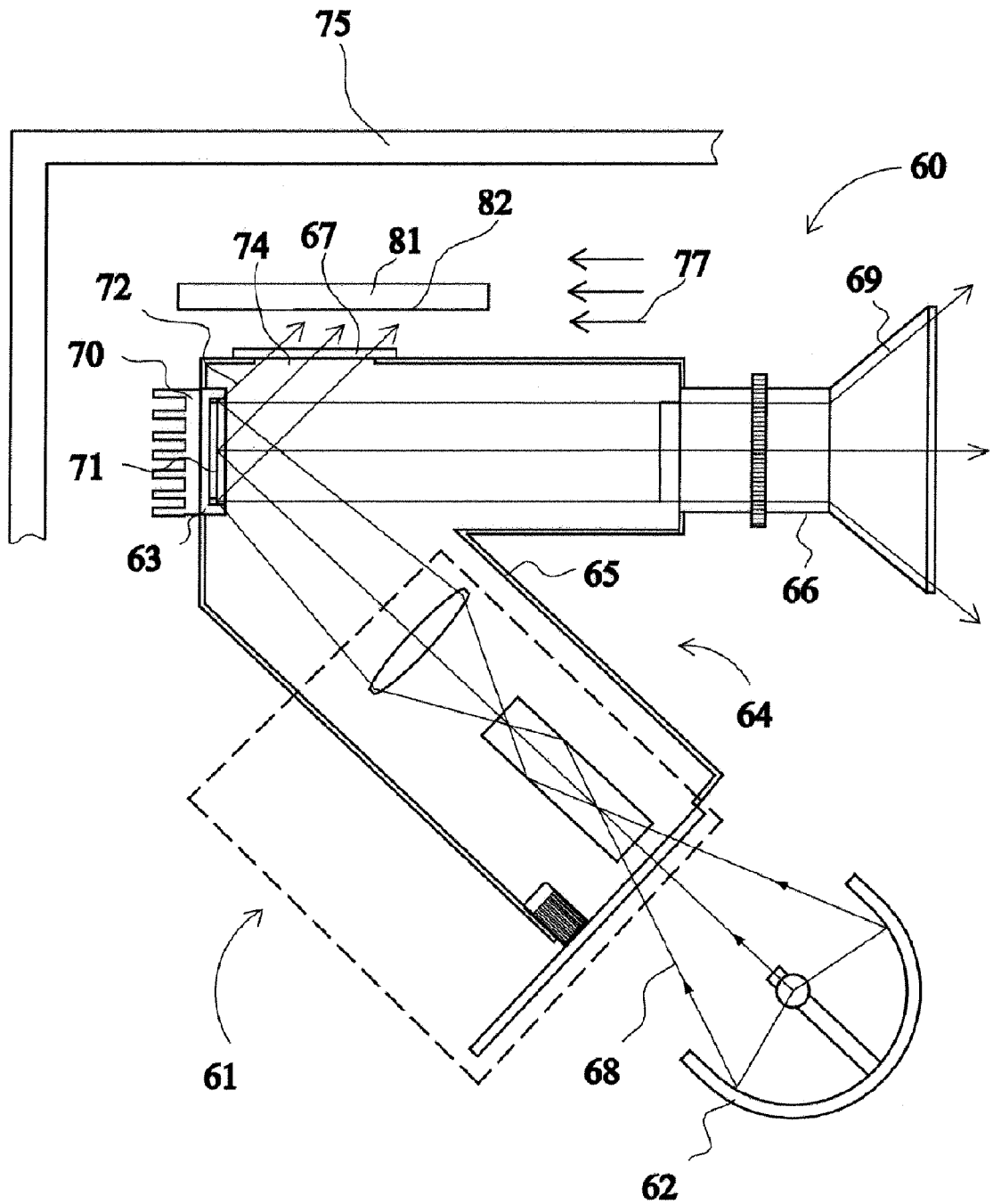
FIG. 6 is a schematic view showing the optical engine of the sixth preferred embodiment.

The optical engine 60 of the fourth preferred embodiment is shown in FIG. 6. In this embodiment, the light-blocking device is a light-blocking plate 81 instead of the housing 75 of the projection device in the third preferred embodiment. A light-absorbing layer 82 is applied on the inner lateral side of the light-blocking plate 81 opposite to the dumped light beam 72 for absorbing the dumped light beam 72. A cooling airflow 77 between the optical engine 60 and the projection device dissipates the heat generated by the dumped light beam 72. The other parts in the fourth preferred embodiment are the same as those in the third preferred embodiment, and thus are not given unnecessary details.

In the third and the fourth preferred embodiments, there is an opening 74 on the case 65. The opening 74 is disposed on the light path of the dumped light beam 72 and the size thereof must allow the dumped light beam 72 to completely pass through and then be projected on the transparent plate 67 covering the opening 74. Thereafter, the dumped light beam 72 passes through the transparent plate 67 and is projected on the light-blocking device. The heat generated by the dumped light beam 72 is dissipated by the cooling airflow 77. According to the present invention, the heat produced by the dumped light beam 72 is removed completely for removing a heat source to the reflective light valve 63. Besides, it is easy to practice the present invention while the cost is low and the effect on lowing the temperature of the reflective light valve 63 is good.

In the fifth preferred embodiment, the light-absorbing layer 76 in the third preferred embodiment is substituted by a light-reflecting layer for reflecting the dumped light beam 72 to a heat-dissipating device disposed between the optical engine 60 and the housing 75 of the projection device, and then the heat is dissipated by the cooling airflow 77 inside the projection device. The other parts in the fifth preferred embodiment are the same as those in the third preferred embodiment, and thus are not given unnecessary details.

In the sixth preferred embodiment, the light-absorbing layer 76 in the third preferred embodiment is substituted by a light-scattering layer for scattering the dumped light beam 72 to the space between the optical engine 60 and the housing 75 of the projection device, and then the heat is dissipated by the cooling airflow 77 inside the projection device. The other parts in the sixth preferred embodiment are the same as those in the third preferred embodiment, and thus are not given unnecessary details.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A heat dissipation structure for an optical engine, the optical engine comprising a light source, an optical main body and a projection lens, the light source generating an incident light beam, the optical main body having a reflective light valve for reflecting the incident light beam to become an image light beam or a dumped light beam, the image light beam being projected through the projection lens for forming an image, the dumped light beam being not projected into the projection lens, the heat dissipation structure comprising:

a case enclosing the light paths of the incident light beam, the image light beam and the dumped light beam, an opening being disposed on the case, the dumped light beam being projected into the opening;

a first heat-dissipating device fixed on the case and covering the opening for removing heat generated from the dumped light beam; and a heat-insulating device disposed between the first heat-dissipating device and the case for preventing heat conduction between the first heat-dissipating device and the case.

2. The heat dissipation structure for an optical engine according to claim 1, wherein the optical main body further comprises a light-filtering module for filtering the incident light beam to have a specific color and to be projected on the reflective light valve.

3. The heat dissipation structure for an optical engine according to claim 1, wherein the heat-insulating device is a cushion of a heat-insulating material.

4. The heat dissipation structure for an optical engine according to claim 3, wherein the cushion is made of rubber.

5. The heat dissipation structure for an optical engine according to claim 1, wherein a light-absorbing layer is applied on one side of the first heat-dissipating device facing the opening.

6. The heat dissipation structure for an optical engine according to claim 1, wherein the first heat-dissipating device is a heat sink.

7. The heat dissipation structure for an optical engine according to claim 1, wherein the heat-insulating device is heat-insulating glue.

8. The heat dissipation structure for an optical engine according to claim 1, further comprising a second heat-dissipating device fixed on the reflective light valve for removing heat on the reflective light valve.

9. A heat dissipation structure for of an optical engine, the optical engine comprising a light source, an optical main body and a projection lens, the light source generating an incident light beam, the optical main body having a reflective light valve for reflecting the incident light beam to become an image light beam or a dumped light beam, the image light beam being projected through the projection lens for forming an image, the dumped light beam being not projected into the projection lens, the heat dissipation structure comprising:

a case enclosing the light paths of the incident light beam, the image light beam and the dumped light beam, an opening being disposed on the case, the dumped light beam being projected into the opening;

a transparent plate fixed on the case and covering the opening for the dumped light beam to be projected out of the case through the transparent plate; and a light-blocking device disposed outside the casing for blocking an ambient light from entering the case through the transparent plate.

10. The heat dissipation structure for an optical engine according to claim 9, wherein the optical main body further comprises a light-filtering module for filtering the incident light beam to have a specific color and to be projected on the reflective light valve.

11. The heat dissipation structure for an optical engine according to claim 9, wherein the transparent plate is transparent glass.

12. The heat dissipation structure for an optical engine according to claim 9, wherein the transparent plate is a mesh.

13. The heat dissipation structure for an optical engine according to claim 9, wherein the optical engine is wrapped by a housing of a projection device, the light-blocking device being the housing of the projection device.

14. The heat dissipation structure for an optical engine according to claim 13, wherein a light-reflecting layer is applied on an inner lateral side of the light-blocking device facing the dumped light beam.

15. The heat dissipation structure for an optical engine according to claim 14, wherein the light-reflecting layer reflects the dumped light beam to a heat-dissipating device between the optical engine and the housing.

16. The heat dissipation structure for an optical engine according to claim 9, wherein a light-absorbing layer is applied on an inner lateral side of the light-blocking device facing the dumped light beam.

17. The heat dissipation structure for an optical engine according to claim 9, wherein a light-scattering layer is applied on an inner lateral side of the light-blocking device facing the dumped light beam.

18. The heat dissipation structure for an optical engine according to claim 9, wherein the light-blocking device is a light-blocking plate of non-transparent material.

19. The heat dissipation structure for an optical engine according to claim 9, wherein a cooling airflow is outside the optical engine.

20. The heat dissipation structure for an optical engine according to claim 9, further comprising a heat-dissipating device fixed on the reflective light valve for removing heat on the reflective light valve.

* * * * *